United States Patent Office 2,847,899
Patented Aug. 19, 1958

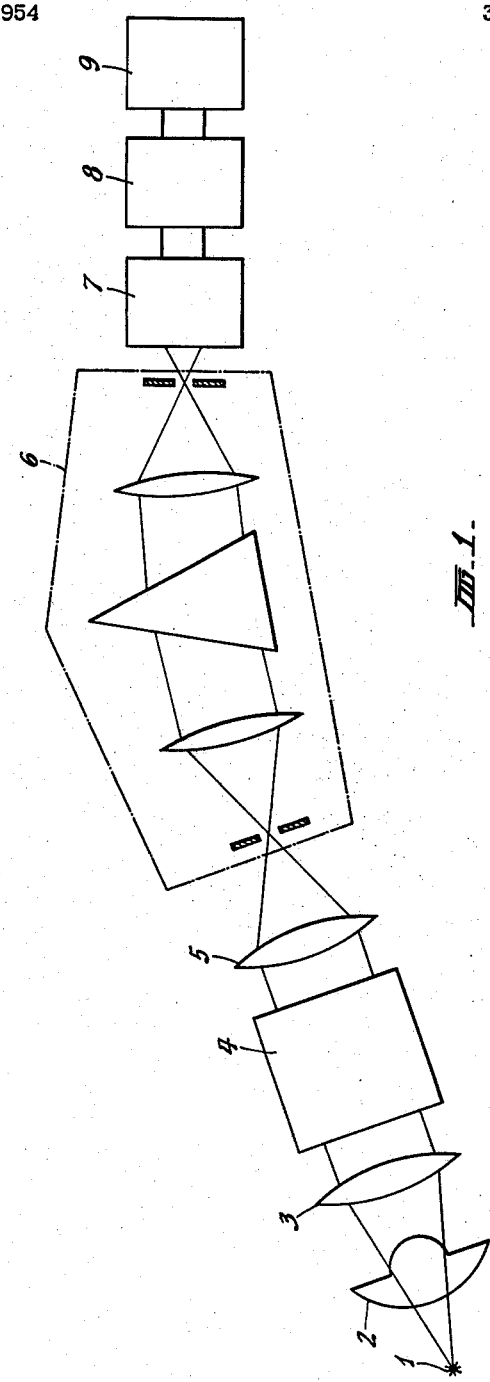

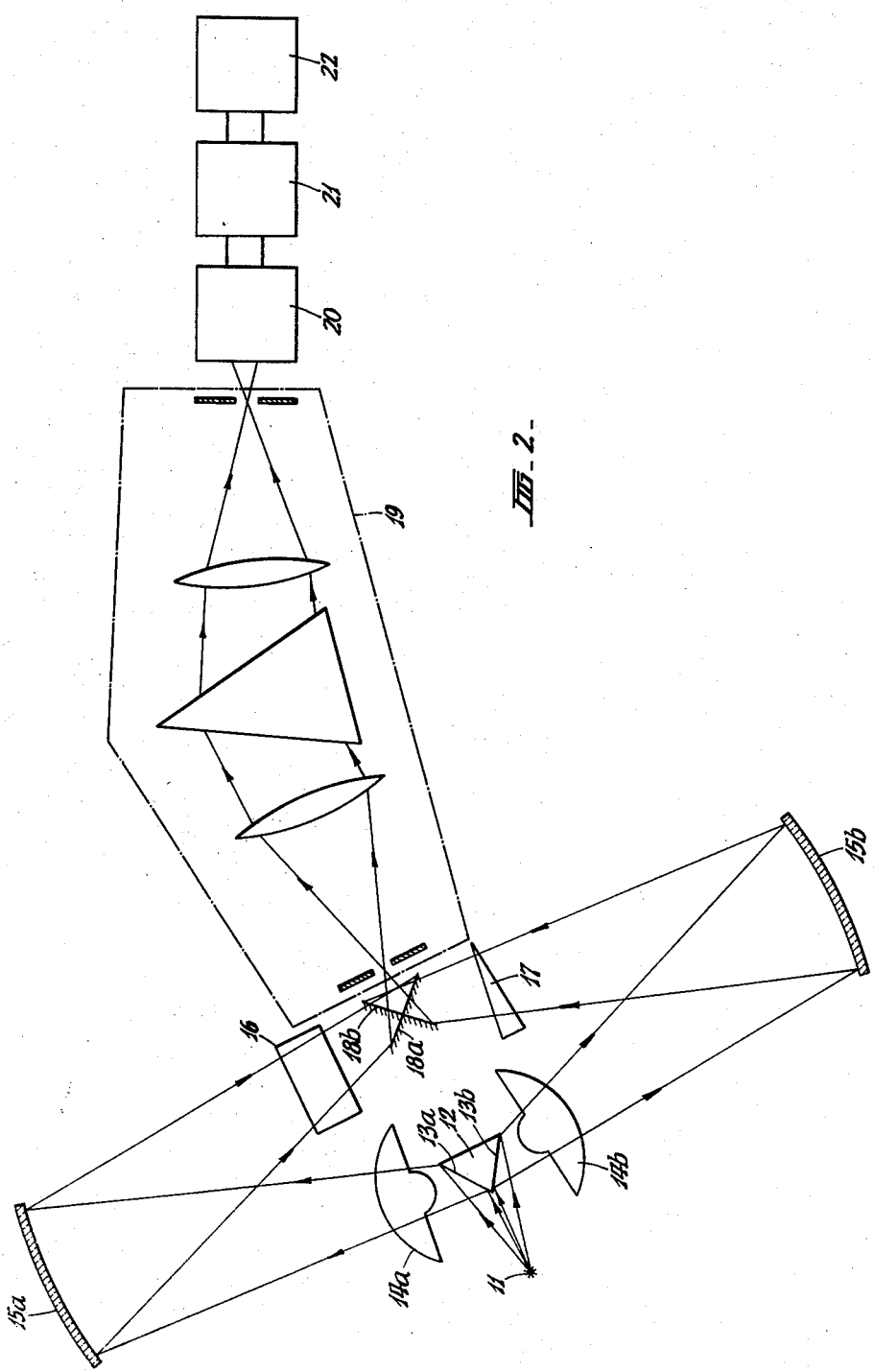

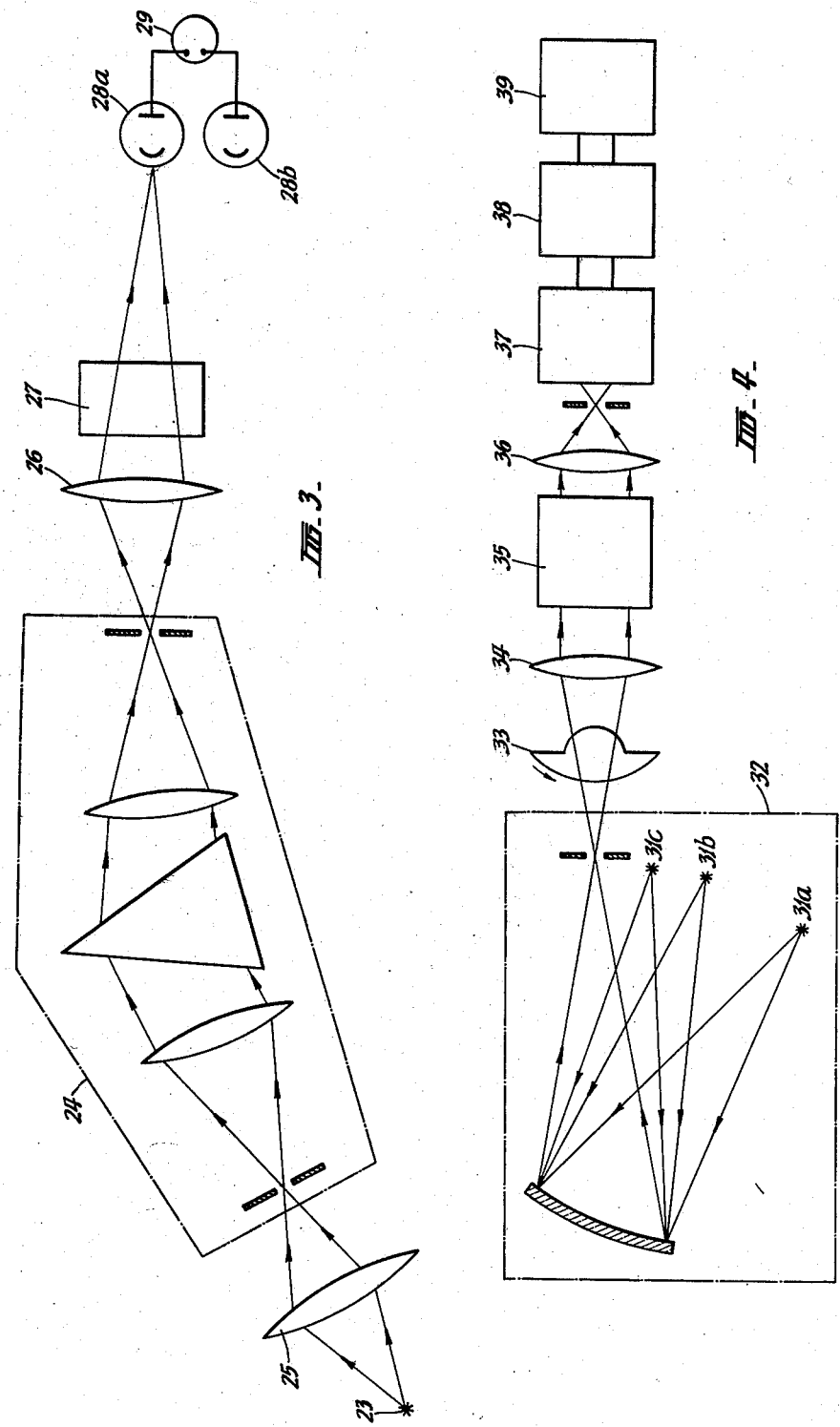

2,847,899

METHOD OF AND APPARATUS FOR SPECTROCHEMICAL ANALYSIS

Alan Walsh, Canterbury, Victoria, Australia, assignor to Commonwealth Scientific and Industrial Research Organization, East Melbourne, Victoria, Australia, a body corporate Application November 16, 1954, Serial No. 469,221

Claims priority, application Australia November 17, 1953

6 Claims. (Cl. 88—14)

This invention relates to a method of and apparatus for spectrochemical analysis.

A well-known method of analysing metal alloys and other materials consists of making an arc or spark discharge between two electrodes, introducing some of the material to be analysed into the discharge, and recording photographically or photoelectrically parts of the emission spectrum of the discharge. By making use of standard samples and comparing the intensities of suitable spectral lines, quantitative analyses can be made. Another well-known method involves a similar examination of the emission spectrum of a flame into which a solution of the material to be analysed is introduced in the form of a fine spray.

Both these methods, although of wide application, have certain limitations. An arc or spark discharge exhibits random fluctuations in intensity so that, even if the integrated intensity over a period of time is observed there is a limit to the accuracy obtainable. Furthermore, if one or both of the electrodes are made of the material to be analysed, non uniformity (segregation) in the metal causes errors. Errors due to segregation are obviated if flame photometric methods are used but, in this case, the sensitivity is rather low. Again, both the methods require standardisation, using chemically analysed specimens, and it may be noted that the spectrum emitted by one element may be markedly affected by the presence of other elements.

The broad object of this invention is to overcome or minimize these limitations.

In this invention, use is made of the principle that an atomic vapour which emits radiation absorbs radiation at wave-lengths corresponding to certain of the lines in its emission spectrum (e. g. mercury vapour absorbs at 2536 A.) Most methods of producing an atomic vapour result in the vapour emitting radiation.

According to one aspect of this invention, in a method of determining spectrochemically the concentration of an element or of an isotope of an element in a substance, a beam of radiation, the spectrum of which contains an atomic spectral line characteristic of the element or isotope, is passed through the substance in the form of an atomic vapour which emits radiation, and thereafter irradiates a detector, and the effect on the detector of radiation emitted by the vapour is eliminated, compensated for or allowed for.

According to another aspect of this invention, apparatus for spectrochemical analysis comprises means for producing a beam of radiation the spectrum of which contains an atomic spectral line characteristic of an element or of an isotope of an element the concentration of which in a substance is to be determined, means for introducing the substance in the form of an atomic vapour which emits radiation, into the path of said beam, means for irradiating a detector with the beam after it passes through the vapour, means for eliminating or substantially eliminating from the beam radiation of wavelength other than that of said atomic spectral line, means for indicating the output of the detector and means for eliminating or compensating for the effect on the indicator of radiation emitted by the vapour.

The absorption of the atomic vapour at the wavelength selected may be determined, for instance, by (i) comparing the responses of the detector when the vapour is respectively present in and absent from the path of the beam, or (ii) splitting the beam into two components of any desired intensity ratio, introducing the vapour into the path of one component and an optical attenuator into the path of the other component, comparing the intensities of the components emerging respectively from the vapour and attenuator, and adjusting the attenuator until the emergent intensity ratio is equal to the incident intensity ratio. Any other method suited to this purpose may, of course, be used.

Apparatus characterised in accordance with this invention is exemplified by the arrangements shown in the accompanying drawings, in which:

Figure 1 is a schematic diagram of one form of the apparatus;

Figure 2 is a schematic diagram of another form of the apparatus;

Figure 3 is a schematic diagram of yet another form of the apparatus, and

Figure 4 is a schematic diagram of a form of the apparatus which is suitable for use in analysing a substance for several elements in quick succession.

Referring now to Figure 1, the reference numeral 1 indicates a primary source which is adapted to emit radiation the spectrum of which contains an atomic spectral line at the wavelength required for a particular analysis. The spectral line to be used for a given analysis will depend upon the type of analysis being carried out. For example, when maximum sensitivity is required, it will usually be desirable to use a resonance line which is a line corresponding to a transition between an excited and a ground state of the atom. The source can conveniently take the form of a discharge lamp in which there is some of the element in respect of which the analysis is to be made. It is possible in some cases to have more than one element in the lamp in which case the one lamp can be used for analysing for more than one element. As an alternative to the use of a lamp a high temperature flame into which an appropriate solution is sprayed may be used. The radiation from the source is modulated by means of a chopper 2 which is adapted to interrupt the beam at a convenient frequency. Any other convenient means whereby the radiation from the source may be modulated can, however, be used. If a discharge lamp is used and it is operated from an alternating current supply, this can sometimes provide sufficient modulation. The modulated beam is collimated by means of the lens 3 and then passes through an atomic vapour 4 of the substance to be analysed. The atomic vapour is produced preferably by spraying a solution of the substance into a flame. Alternatively, a small furnace could be used which is heated sufficiently to vaporise the substance and which contains windows to allow a beam of radiation to be passed through it. The transmitted beam is focused by the lens 5 on the entrance slit of a monochromator 6 by means of which radiation other than the atomic spectral line radiation required for the analysis is eliminated. A filter could be used for this purpose in some cases, but a monochromator is of more general application. It should be noted that in many cases the monochromator need not be capable of high resolution since where possible the source will be chosen to have an emission spectrum containing relatively few spectral lines, and all that is required is the separation of the wanted line from the other lines. The radiation emerging from the monochromator falls on a photoelectric detector 7 which may be, for instance, a photomultiplier. The output from the detector is amplified and rectified by a combination amplifier and rectifier 8 which is designed to respond to signals of frequency corresponding to the modulation frequency of the beam but not to unmodulated signals. The purpose of this is to eliminate the effects of radiation emitted by the vapour so that a measure is made only of the radiation emitted by the primary source. The rectified output of the amplifier is measured by a meter or recorder 9.

The position of the atomic vapour in the system may be varied, if desired, by placing it between the monochromator and the detector. The position of the modulating means may also be varied provided, of course, that in all cases it is positioned so as to interrupt the beam from the source before it reaches the atomic vapour.

If desired, lens 5 may be eliminated and lens 3 used to focus the radiation on the entrance slit of the monochromator.

One method of using the apparatus is to adjust the monochromator or put in a filter, as the case may be, so that only radiation of the desired wavelength from the source reaches the detector, and then to measure the intensity of the modulated beam reaching the detector while there is no vapour in the path of the beam. An atomic vapour of the substance to be analysed is then introduced into the beam and the intensity of the modulated beam reaching the detector is again measured. Due to absorption the second reading will be lower than the first and from the relation between the readings the absorption of the vapour can be calculated. Theoretically, this offers the possibility of calculating the concentration of elements in the vapour but, in practice, to obtain more accurate results calibration with samples of known composition may be desirable.

The apparatus described above requires that the primary source be stable for the period of a measurement. This requirement can be obviated by monitoring the source intensity instead of modulating the radiation from the source. One method of doing this is to pass the radiation from the source alternately along two separate paths into the monochromator, the amplifier being tuned so as to respond to signals of frequency corresponding to the frequency of alternation of the beams but not to unmodulated signals. The intensity of the radiation passing along the respective paths is at first made equal so that there is no output from the amplifier. The vaporised substance to be analysed is then placed in one path and a calibrated optical attenuator in the other path, the attenuator being then adjusted until here is again no ouput from the amplifier. The reading of the attenuator is then a measure of the amount of radiation absorbed by the vapour.

An apparatus suitable for this purpose is shown in Figure 2 of the drawings. Radiation from a source 11 is split into two beams by means of a prism 12 which is provided with two reflecting surfaces 13a, 13b. A pair of choppers 14a, 14b are provided which are adapted to be rotated with a phase difference of 180° so that the two beams are interrupted alternately. The beams fall on and are reflected by concave mirrors 15a, 15b, respectively, the reflected beam from mirror 15a passing through an atomic vapour 16 of the substance to be analysed while the reflected beam from mirror 15b passes through a calibrated attenuator 17. The beams are then directed by mirrors 18a, 18b respectively through the entrance slit of a monochromator 19. As above, a filter may be used instead of a monochromator in some cases. Radiation emerging from the monochromator (or filter) falls on a photoelectric detector 20 the output of which is amplified and rectified by a combination amplifier and rectifier 21 designed to respond to signals of frequency corresponding to the frequency of alternation of the beams but not to unmodulated signals. The rectified output of the amplifier is indicated by an indicator 22.

In an alternative arrangement, the attenuator may be omitted and the ratio of the intensity of the two beams measured directly.

Other means of monitoring the source intensity will be obvious to those skilled in the art.

As an alternative to eliminating the effect of radiation emitted by the atomic vapour, this effect may be compensated for. An arrangement suitable for this purpose is shown in Figure 3 of the drawings.

Radiation from a source 23 is focussed on the entrance slit of a monochromator 24 by a lens 25. Again, a filter may be used instead of a monochromator in some cases. Radiation emerging from the monochromator (or filter) passes through a lens 26 and an atomic vapour 27 of the substance to be analysed, the lens 26 serving to focus the beam on one of a pair of photoelectric detectors 28a, 28b which are connected to a galvanometer 29 adapted to measure the difference between the outputs of the two detectors.

In preparing this apparatus for use, the source is switched off or shielded and the detectors 28a, 28b are so arranged that their outputs due to the radiation emitted by the vapour, are equal and opposite. The presence of the vapour will not then cause any deflection of the galvanometer. The source is then switched on or uncovered, as the case may be, and the galvanometer reading taken. A second reading is taken in the absence of the vapour. From the ratio of these two readings, a measure of the absorption of the vapour can be obtained.

In yet another alternative, instead of eliminating or compensating for the effect of the radiation emitted by the vapour, allowance is made for this effect. A primary source is placed so as to irradiate a detector and the intensity of the radiation reaching the detector is measured while there is no vapour in the path of the beam. An atomic vapour of the substance to be analysed is then introduced into the beam and the intensity of the radiation reaching the detector is again measured. A final measurement is made with the vapour still present but with the primary source switched off or shielded. The absorption of the vapour can be calculated from these measurements.

In the arrangement shown in Figure 4, a number of primary sources 31a, 31b, 31c and so on are arranged on the focal curve of a concave grating spectrograph 32. Other types of spectrograph can, of course, be used if desired. Each of the sources is capable of emitting atomic spectral line radiation at a wavelength which is characteristic of a particular element and the source is so positioned on the focal curve that only the desired line radiation passes through the slit of the spectrograph. The radiation from the various sources is modulated as, for instance, by means of a chopper 33. The modulated beam is collimated by the lens 34, is then passed through an atomic vapour 35 of the substance to be analysed, and is finally focussed by means of lens 36 on to a suitable detector 37. The two lenses 34 and 36 may, of course, be replaced by a single lens if desired. The output from the detector is amplified and rectified by the combination amplifier and rectifier 38 which is tuned to the moduation frequency, and the rectified output is measured by means of the meter or recorder 39.

This apparatus is suitable for use in analysing a substance for several elements in rapid succession. A measurement from which the concentration of element A may be determined is made using only radiation from the source 31a, the sources 31b, 31c and so on being switched off or shielded so that radiation emitted by them will not pass through the spectrograph. Source 31a may then be switched off or shielded and source 31b switched on or uncovered to permit a measurement to be made from which the concentration of element B may be determined, and so on.

The advantages of this invention are that it offers the possibility of absolute as well as comparative work, and that the apparatus can be made sensitive and accurate. Methods using emission apparatus are not absolute, and it is necessary to contend with the vagaries of arc or spark discharges and, in some cases, segregation in the sample, or to be satisfied with the relatively insensitive methods of emission flame photometry. The present apparatus is rapid in use and, in this respect, compares with direct reading photoelectric emission methods. Further, a relatively coarse monochromator suffices whereas, when emission apparatus with direct reading is used, a high quality dispersing system is essential and great care is necessary to keep narrow exit slits exactly centred on the chosen lines in the emission spectrum. Again, in the customary use of emission apparatus the intensity of a line emitted by one element may be disturbed by the presence of another element. The corresponding effect on intensity of absorption is often negligible when the present apparatus is used.

A special advantage of this invention is that concentrations of one isotope of an element can be determined in the presence of other isotopes since it is only necessary to have a primary source in which the required isotope alone is present, or two primary sources having ratios of isotope concentration which are different and known.

As abovementioned, the determination of the absorption of radiation by an atomic vapour offers, theoretically, the possibility of calculating the concentration of elements in the vapour. In practice, however, it will generally be found preferable to calibrate the apparatus with samples of known composition. In this connection, however, it is important to note that, for a particular substance, the absorption due to the presence of a particular element or isotope in an atomic vapour produced by one method may be quite different from that due to the presence of the same element or isotope in an atomic vapour produced by another method. Thus, for instance, whereas in the case of an atomic vapour produced by spraying a solution into a flame, it is found that the presence of 1 part per million of sodium, copper or magnesium produces an absorption of the order of 1%, it may be that a substantially different percentage absorption would result if the atomic vapour was to be produced by another method.

I claim:

1. A method of determining spectrochemically the concentration in a substance of a member of the group consisting of an element and isotopes of that element; comprising the steps of converting said substance into an atomic vapour which emits radiation, passing through said atomic vapour a beam of radiation the spectrum of which contains an atomic spectral line characteristic of a member of said group, and measuring the ratio between the incident and emergent intensities of said beam, which ratio is determinative of the concentration of said member.

2. A method of determining spectrochemically the concentration in a substance of a member of the group consisting of an element and isotopes of that element; comprising the steps of converting said substance into an atomic vapour which emits radiation, passing through said atomic vapour a beam of radiation the spectrum of which contains an atomic spectral line characteristic of a member of said group, irradiating a detector with said beam after the latter has passed through said atomic vapour while eliminating the effect on the detector of radiation emitted by said vapour, irradiating said detector by a beam having an intensity equal to that of the first mentioned beam in the absence of said atomic vapour, and measuring the ratio of the signals produced on the detector by said beams, which ratio is a function of the concentration of said member to be determined.

3. A method of determining spectrochemically the concentration in a substance of a member of the group consisting of an element and isotopes of that element; comprising the steps of converting said substance into an atomic vapour which emits radiation, passing through said atomic vapour a beam of radiation the spectrum of which contains an atomic spectral line characteristic of a member of said group, irradiating a detector with said beam after the latter has passed through said atomic vapour while compensating for the effect on the detector of radiation emitted by said vapour, irradiating said detector by a beam having an intensity equal to that of the first mentioned beam in the absence of said atomic vapour, and measuring the ratio of the signals produced on the detector by said beams, which ratio is a function of the concentration of said member to be determined.

4. A method of determining spectrochemically the concentration in a substance of a member of the group consisting of an element and isotopes of that element; comprising the steps of converting said substance into an atomic vapour which emits radiation, passing through said atomic vapour a beam of radiation the spectrum of which contains an atomic spectral line characteristic of a member of said group, irradiating a detector with said beam after the latter has passed through said atomic vapour, irradiating the detector by the radiation emitted by the atomic vapour of said substance alone, measuring the signal produced on the detector by said radiation emitted from said atomic vapour alone to allow for the effect on the detector of radiation emitted by said vapour, irradiating said detector by a beam having an intensity equal to that of the first mentioned beam in the absence of said atomic vapour, and measuring the ratio of the signals produced on the detector by said beams, which ratio is a function of the concentration of said member to be determined.

5. Apparatus for determining spectrochemically the concentration in a substance of a member of the group consisting of an element and isotopes of that element, comprising means producing a modulated beam of radiation the spectrum of which contains an atomic spectral line characteristic of a member of said group, means converting the substance into an atomic vapour which emits radiation, means for holding the atomic vapour in the path of said beam, a detector arranged so that it is irradiated by the beam after it passes through the atomic vapour, means substantially eliminating from the beam radiation of wavelength other than that of said atomic spectral line, an indicator operative to indicate the output of the detector and means operative to eliminate the effect on the indicator of radiation emitted by the vapour.

6. Apparatus for determining spectrochemically the concentration in a substance of a member of the group consisting of an element and isotopes of that element, comprising means producing a modulated beam of radiation the spectrum of which contains an atomic spectral line characteristic of a member of said group, means converting the substance into an atomic vapour which emits radiation, means for holding the atomic vapour in the path of said beam, a detector arranged so that it is irradiated by the beam after it passes through the atomic vapour, means operative to substantially eliminate from the beam radiation of wavelength other than that of said atomic spectral line, and an indicator operative to indicate the output of the detector, and which is tuned so as to respond only to signals of frequency corresponding to the modulation frequency of the beam, thereby to eliminate from the indication the effect of the radiation emitted by the atomic vapour.

(References on following page)

References Cited in the file of this patent

UNITED STATES PATENTS

| | | |
|---|---|---|
| 1,829,001 | Geromanos | Oct. 27, 1931 |
| 2,585,901 | Dieke | Feb. 19, 1952 |
| 2,607,899 | Cary et al. | Aug. 19, 1952 |
| 2,650,307 | Koppius | Aug. 25, 1953 |

OTHER REFERENCES

Journal of the Optical Society of America, "The Absorption of Light by Sodium Vapor" by Karl K. Darrow, vol. 8, No. 1, January 1924, page 10.

Optical Methods of Chemical Analysis by Thomas R. P. Gibb, Jr., published by McGraw-Hill Book Co., Inc., New York, 1942, page 119, section 66.